United States Patent
Tang (10) Patent No.: US 12,327,959 B2
(45) Date of Patent: Jun. 10, 2025

(54) COMPACT CONNECTORS WITH INTEGRATED WIRELESS COMMUNICATION ELEMENTS

(71) Applicant: NXP USA, Inc., Austin, TX (US)

(72) Inventor: Jinbang Tang, Chandler, AZ (US)

(73) Assignee: NXP USA, INC., Austin, TX (US)

(*) Notice: Subject to any disclaimer, the term of this patent is extended or adjusted under 35 U.S.C. 154(b) by 132 days.

(21) Appl. No.: 18/154,009

(22) Filed: Jan. 12, 2023

(65) Prior Publication Data
US 2024/0243529 A1      Jul. 18, 2024

(51) Int. Cl.
| | |
|---|---|
| H01R 13/66 | (2006.01) |
| G08B 21/18 | (2006.01) |
| H04M 1/02 | (2006.01) |
| H01R 24/60 | (2011.01) |
| H01R 107/00 | (2006.01) |

(52) U.S. Cl.
CPC ......... *H01R 13/6691* (2013.01); *G08B 21/18* (2013.01); *H04M 1/0274* (2013.01); *H01R 24/60* (2013.01); *H01R 2107/00* (2013.01)

(58) Field of Classification Search
CPC ....... H04M 1/0274; H01Q 1/38; H01Q 1/243; H01Q 13/10; G06F 1/1698; H01R 2201/02
See application file for complete search history.

(56) References Cited

U.S. PATENT DOCUMENTS

| | | | |
|---|---|---|---|
| 11,011,945 B2 | 5/2021 | Shirsat | |
| 2008/0136716 A1* | 6/2008 | Annamaa | H01Q 1/50 |
| | | | 29/601 |
| 2011/0043413 A1* | 2/2011 | Zadesky | H01R 13/665 |
| | | | 343/702 |
| 2014/0242927 A1 | 8/2014 | Mooney et al. | |
| 2015/0062828 A1 | 3/2015 | Shirai | |
| 2017/0257146 A1* | 9/2017 | Szeto | H04W 4/80 |
| 2021/0174953 A1* | 6/2021 | McKeown | G16H 40/63 |
| 2022/0393380 A1* | 12/2022 | Kim | H01R 12/79 |

FOREIGN PATENT DOCUMENTS

| | | |
|---|---|---|
| CN | 114665319 A | 6/2022 |
| JP | 2001036319 A | 3/2016 |
| JP | 2016032246 A | 3/2016 |

OTHER PUBLICATIONS

Lanteri, J. et al; "60 GHz Antennas in HTCC and Glass Technology"; Proceedings of the Fourth European Conf. on Antennas and Propagation, Barcelona, Spain, Apr. 12-16, 2020; IEEE Xplore; 4 pages (Jul. 8, 2010).
Lee, Jri et al; "A Low-Power Low-Cost Fully-Integrated 60-GHz Transceiver System With OOK Modulation and On-Board Antenna Assembly"; IEEE J. Solid-State Circuits, vol. 45, No. 2; 12 pages (Feb. 2010).
Wikipedia; Lightning (connector); retrieved from the Internet https://wikipedia.org/wiki/Lightning_(connector); 8 pages (Sep. 23, 2021).

* cited by examiner

*Primary Examiner* — Mirza F Alam (57) ABSTRACT

An electrical connector port disposed within a mobile device such as a smart phone is provided with a wireless antenna coupled to the electrical connector port which. A housing of the connector port, together with the antenna, defines a directional antenna gain pattern enabling the wireless antenna to be used for directional communication between the mobile device and another device.

22 Claims, 6 Drawing Sheets

COMPACT CONNECTORS WITH INTEGRATED WIRELESS COMMUNICATION ELEMENTS

FIELD OF THE INVENTION

Embodiments of the subject matter described herein relate to structures and devices for wireless communication and electrical connectors for computing devices.

BACKGROUND OF THE INVENTION

Connectors for computing devices and related electronics have benefited from trends toward miniaturization. Examples include USB C connectors and micro-USB connectors. Some connectors with similar form factors also include magnetic elements to allow for quick connection and disconnection. At the same time, portable electronic devices increasingly include wireless interfaces for communication and charging.

SUMMARY OF THE INVENTION

In an example embodiment, a mobile device has a device housing with an electrical connector port disposed within the device housing that is coupled to a wireless antenna. The electrical connector port includes a connector housing and electrical signal pins. The connector housing extends within the mobile device housing and has an aperture exposed at an exterior surface of the device housing. The electrical signal pins are disposed within the connector housing and configured to mate with an electrical connector. The wireless antenna is coupled to the electrical connector port and configured to transmit or receive wireless signals. The connector housing of the electrical connector port is configured to guide electromagnetic radiation between an external environment and the wireless antenna.

In another example embodiment, a method includes disposing, within a device housing of the device, an electrical connector port. The electrical connector port includes a connector housing and electrical signal pins disposed within the connector housing such that an aperture of the connector port exposes the electrical signal pins at a surface of the device housing. The method further includes disposing, within the device housing of the device, a wireless antenna coupled to the electrical connector port. The electrical signal pins and configured to mate with a corresponding electrical connector within the aperture; and the connector housing is configured to guide wireless signals between an external environment and the wireless antenna by the connector housing. The wireless antenna coupled to the electrical connector port is configured to transmit or receive the wireless signals.

In another example embodiment, a method includes configuring a mobile device to communicate wirelessly with another device via a wireless antenna coupled to an electrical connector port disposed within a device housing of the mobile device. The electrical connector port includes a connector housing that extends within the mobile device housing and has an aperture exposed at an exterior surface of the device housing; and electrical signal pins that are disposed within the connector housing and configured to mate with an electrical connector.

The wireless antenna coupled to the electrical connector port is configured to transmit or receive wireless signals using a transmission frequency of at least 40 GHz and the connector housing of the electrical connector port is configured to guide electromagnetic radiation between an external environment and the wireless antenna.

In one or more such embodiments, the method further includes receiving, by a processor of the mobile device, an electrical signal via one or more of the electrical signal pins of the electrical connector port. In such embodiments the method further includes determining, by the processor, that the electrical signal indicates that an electrical connector is present within the electrical connector port. In such embodiments the method further includes outputting, by the processor and in response to the processor determining that the electrical signal indicates that the electrical connector is present within the electrical connector port, a human-perceptible notification for a user of the mobile device to disconnect the electrical connector from the electrical signal port before initiating wireless communication with the other device.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein.

DETAILED DESCRIPTION

The following detailed description provides examples for the purposes of understanding and is not intended to limit the invention or the application and uses of the same. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements or regions in the figures may be exaggerated relative to other elements or regions to help improve understanding of embodiments of the invention.

The terms "first," "second." "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. The term "coupled," as used herein, is defined as directly or indirectly connected in an electrical or non-electrical manner. As used herein the terms "substantial" and "substantially" mean sufficient to accomplish the stated purpose in a practical manner and that minor imperfections, if any, are not significant for the stated purpose.

Directional references such as "top." "bottom," "left," "right," "above," "below," and so forth, unless otherwise stated, are not intended to require any preferred orientation and are made with reference to the orientation of the corresponding figure or figures for purposes of illustration.

It will be appreciated that the steps of various processes described herein are non-limiting examples of suitable processes according to embodiments and are for the purposes of illustration. Systems and devices according to embodiments herein may be use any suitable processes including those that omit steps described above, perform those steps and similar steps in different orders, and the like. It will also be appreciated that well-known features may be omitted for clarity.

Unless explicitly stated otherwise, the use of terms "approximately." "substantially" and similar terms in connection with dimensions, relative positioning, or orientation of various features indicates that the dimensions, positioning, or orientation of those features are subject to tolerances and/or expected process variations of equipment and processes chosen to form the described features. Unless explicitly stated otherwise, the use of terms "approximately," "substantially" and similar terms in connection measurable values or characteristics is subject to the expected measurement accuracy of equipment and methods used to measure those values or characteristics and/or within tolerance limits specified by technical standards applicable to the technologies described.

Many mobile devices such as smart phones, tablets, and the like include at least one connector port for charging and/or wired data connections to other devices in addition to one or more antennae for wireless communication protocols including Bluetooth, Wi-Fi, and/or cellular technologies such as 4G LTE, 5G LTE, and the like.

Miniaturization of radiofrequency and microwave electronics for generating and receiving wireless signals for use in mobile devices present challenges because of the need for structures such as antennae to couple signals from packaged components (e.g., individual chips, systems on a chip, multichip packages, and the like) to free space. As mobile devices have become smaller and more ubiquitous, the space available to integrate connectors, displays, and wireless components has become more scarce and economic pressures call for continued reduction in unit costs.

Accordingly, devices according to embodiments locate one or more wireless communication antennae within or adjacent to spaces that may already be allocated for a compact electrical connector (e.g., a USB C connector, micro-USB connector or any other suitable compact connector). In addition to potential space and cost savings, locating wireless communication elements in or near an existing external connector can provided a useful alignment cue for short-range directional communication links between devices, as will be discussed further below.

Figure 1A:
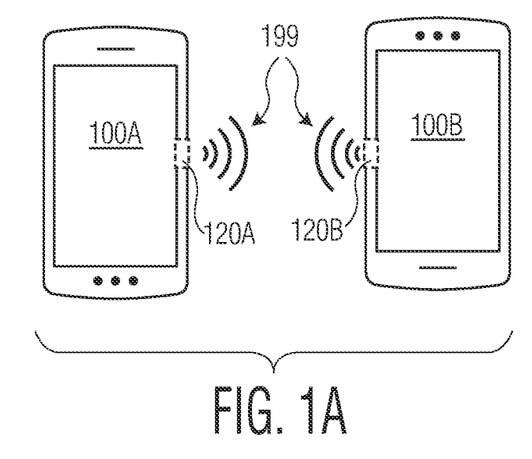
FIG. 1A and FIG. 1B are schematic illustrations of two wireless communication schemes utilizing connectors according to embodiments herein.

FIG. 1A shows a first environment in which two mobile devices 100 (mobile devices 100A, 100B) exchange wireless communication signals 199 in a "broadside" configuration via antenna elements (not shown; see FIG. 2A) disposed within the mobile devices 100 having radiation patterns that are substantially within the plane depicted. In FIG. 1A each mobile device 100 has two short edges and two longer edges and the antennae are disposed within a long edge of each device. When the devices 100A, 100B are oriented as shown, their respective antennae face each other and the devices can establish a line-of-sight communication link. In one or more embodiments it is necessary to ensure that an electrical connector is not inserted into the connector port of a device before the connector port can be used to facilitate wireless communications.

Figure 1B:
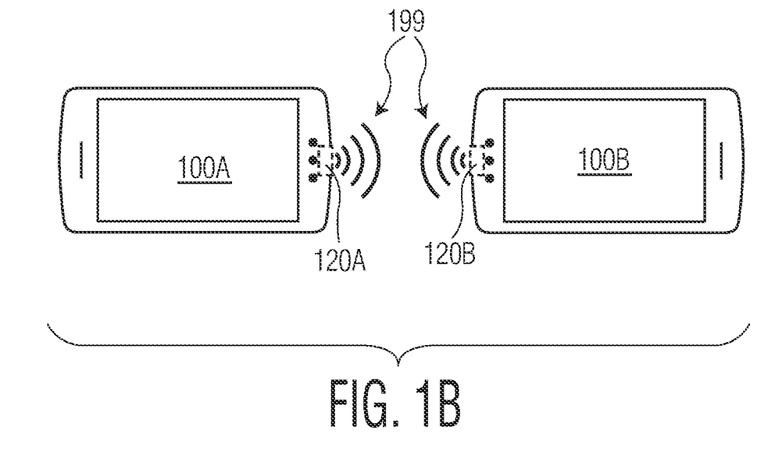

The antennae are coupled to electrical connector ports 120A, 120B of the mobile devices. Together with their respective antennae, the ports 120A, 120B can each form a portion of a directional antenna system as described further below in connection with FIG. 2A. FIG. 2B, and FIG. 3, for example. FIG. 1B depicts an alternative arrangement in which the ports 120A, 120B of the mobile devices 100A, 100B are disposed within short edges of the devices 100A, 100B.

Figure 2A:
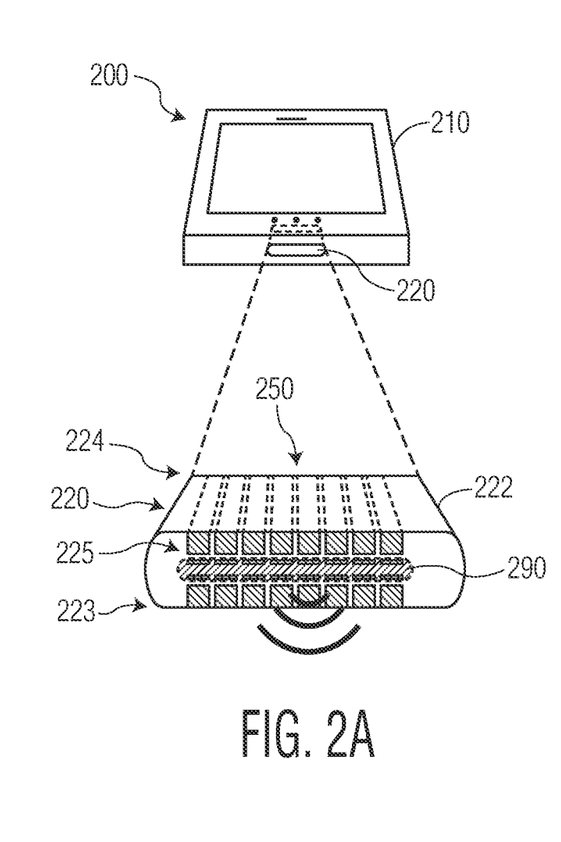
FIG. 2A is a perspective view of a mobile device provided with a connector according to one or more embodiments.
Figure 2B:
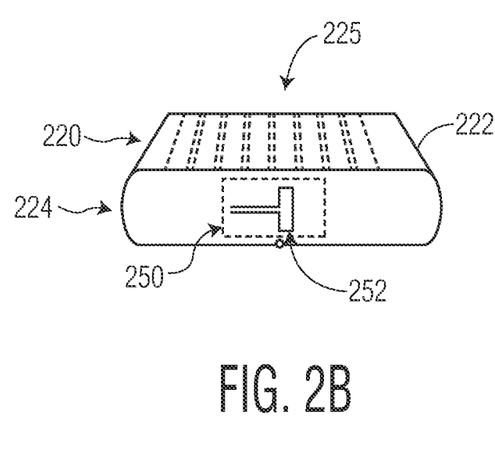
FIG. 2B is a rear perspective view of the connector of FIG. 2A.
Figure 3:
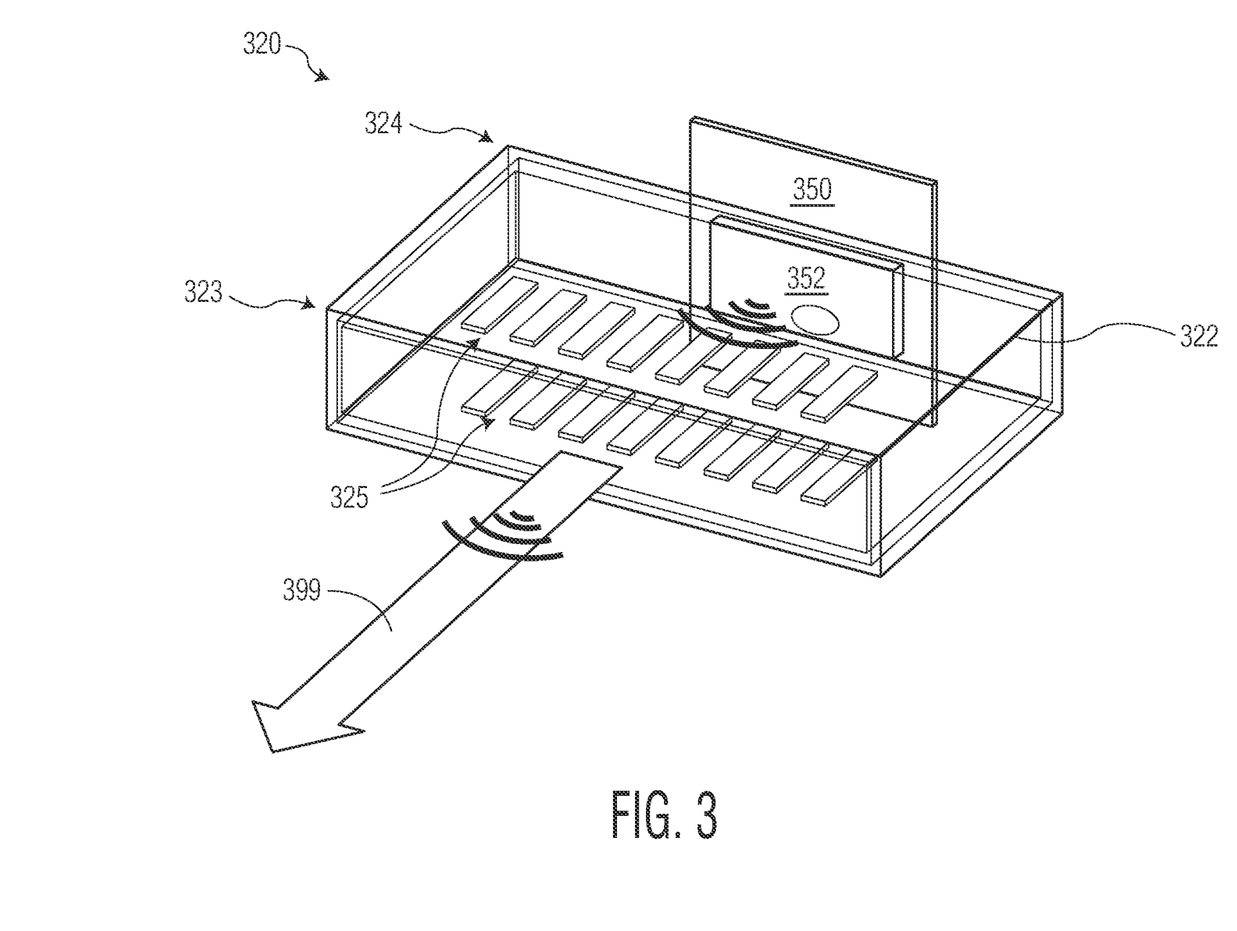
FIG. 3 is a perspective view of a connector related to the connector of FIG. 2A and FIG. 2B.

FIG. 2A is a perspective view of an example mobile device provided with includes a wireless antenna integrated with a compact electrical connector according to one or more embodiments. As shown, the mobile device 200 (e.g., a smart phone, tablet, or other similar device such as a mobile device 100) has a device housing 210 and an electrical connector port (a port 220, e.g., a port 120) that is disposed within the device housing 210. As shown in the exploded view, the port 220 includes a housing 222 that extends from a front portion 223 of the port 220 to a back end of the port 220 of the in which electrical signal pins (pins 225) are enclosed. The pins 225 are exposed at the front portion 223 and extend toward the back end 224 where they may be coupled to other components (not shown) within the device 200. The port 220 is depicted with two rows of pins 225 on opposing sides of the housing 222 Also shown is the outline of a connector 290 mated with the pins 225 for purposes of illustration.

FIG. 2B shows a rear perspective view of the port 220. The port 220 includes a region 250 at or near the rear portion 224 of the port 220 that includes a wireless antenna 252 (depicted schematically in this example as a folded dipole antenna).

It will be appreciated that the port 220 is shown for purposes of illustration only and that nothing herein is intended to limit electrical connector ports according to embodiments herein to any particular number of electrical signal pins or to any specific arrangement of such pins unless explicitly stated otherwise. For example, an electrical connector port such as the port 220 according to one or more embodiments may have only a single row of pins 225 or a different number of pins 225 than depicted. As a further example, in one or more embodiments an electrical connector port has "vertically" oriented pins as opposed to "horizontally" oriented pins as shown in FIGS. 2A-2B.

Similarly, unless stated otherwise, nothing herein is intended to limit embodiments to specific dimensions or shapes. As a nonlimiting examples: In one or more embodiments, an electrical connector port such as the port 220 has a height that is equal to or less than 3 mm; and in one or more embodiments, an electrical connector port such as the port 220 has a width that is equal to or less than 12 mm. In such examples, an antenna such as the antenna 252 may be configured to operate in a frequency range of 50-150 GHz, as one nonlimiting example, or in any other suitable range contained within that frequency range, including any suitable frequency equal to or greater than 40 GHz. As further non-limiting examples, a port such as the port 220 may have a rectangular cross-section or an elliptical cross-section.

In one or more embodiments, the connector housing of an electrical connector port such as the connector housing 222 is configured to guide wireless signals between an antenna according to embodiments herein and external environment (e.g., as shown in FIG. 1A or FIG. 1B). In one or more embodiments, a connector housing such as the connector housing 222 is metallic or formed from another electrically-conductive material.

FIG. 3 shows a CAD rendering of a port 320 (e.g., the port 220) with sixteen pins 325 arranged in two parallel course of eight pins each disposed within a connector housing 322, accessible via the aperture at the front portion 323 of the housing 320. The port 320 has a region 350 at its rear portion 324 that has an antenna 352. In this example, the port 320 has a width of 11.4 mm and a height of 2.4 mm. The antenna 352 is modeled as a compact planar horn antenna. The results of an electromagnetic simulation of the antenna gain of the antenna 352 are described below in connection with FIG. 4.

Figure 4:
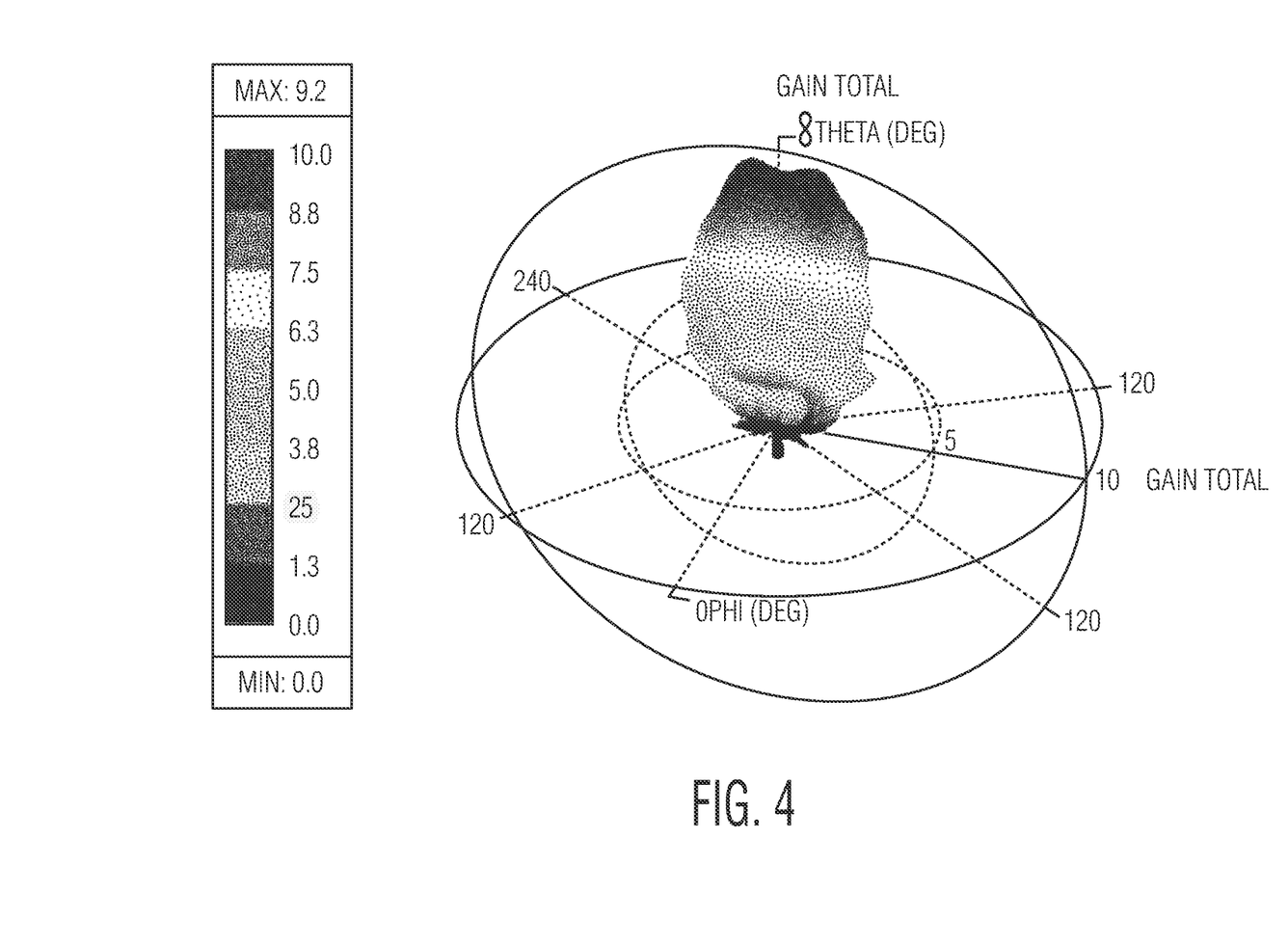
FIG. 4 is a simulated antenna gain plot for the connector of FIG. 3.

FIG. 4 shows the simulated antenna gain pattern for the antenna 352 of FIG. 3. The antenna gain pattern is highly directed along an axis perpendicular to the surface of the antenna 352 facing the front portion 324 of the port 320 (i.e., along the axis 399 in FIG. 3), with a maximum gain of approximately 9.6 dB relative to an isotropic antenna (9.6 dBi) along the axis 399 of FIG. 3.

Figure 5:
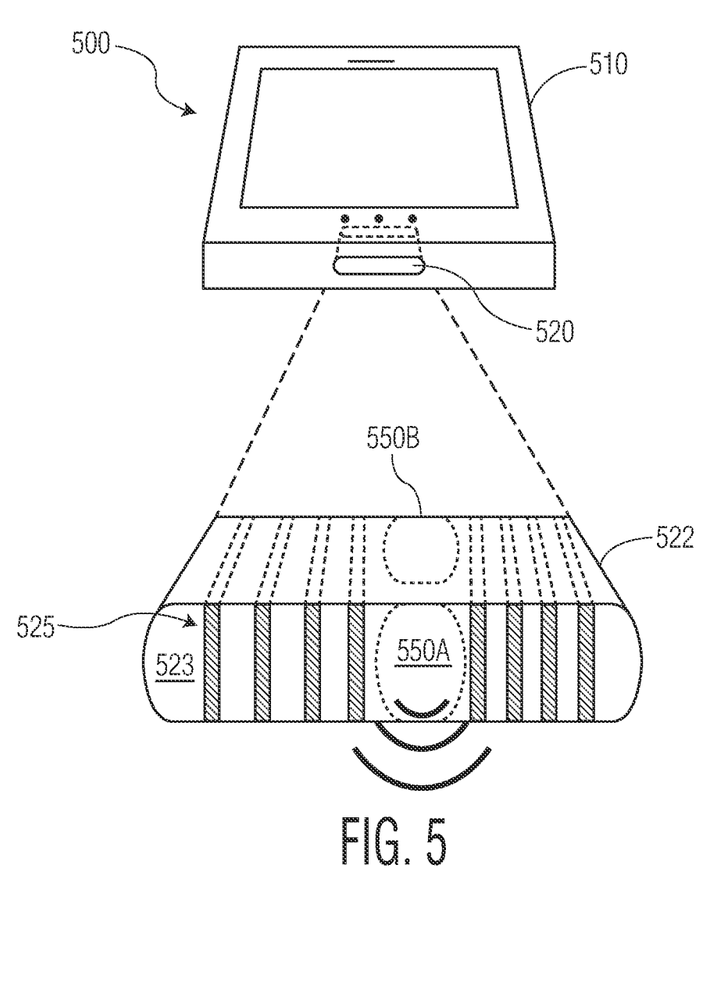
FIG. 5 is a perspective view of a mobile device provided with another connector according to one or more embodiments.

As above, embodiments herein may be practiced with different types of connectors. FIG. 5 shows a mobile device 500 (e.g., a mobile device 100/200) with a device housing 510 (e.g., a housing 210) and an electrical connector (the port 520) with electrical signal pins 525 which are arranged "vertically" in contrast with the "horizontal" arrangements depicted for the ports 220,320. As shown, the housing 522 has a solid front face 530 that includes the signal pins 525. The port 522 is representative of connector ports for magnetically coupled connectors and can contain magnetic materials (not separately shown). One or more wireless antennae can be disposed near the front face 523 of the port 520 (e.g., near the region 550A) or near the rear portion of the port 520 (e.g., near the region 550B). Wireless signals can be guided in between one or more signal pins 525 and/or walls of the housing 520, including as shown in FIG. 5 as one nonlimiting example.

Figure 6:
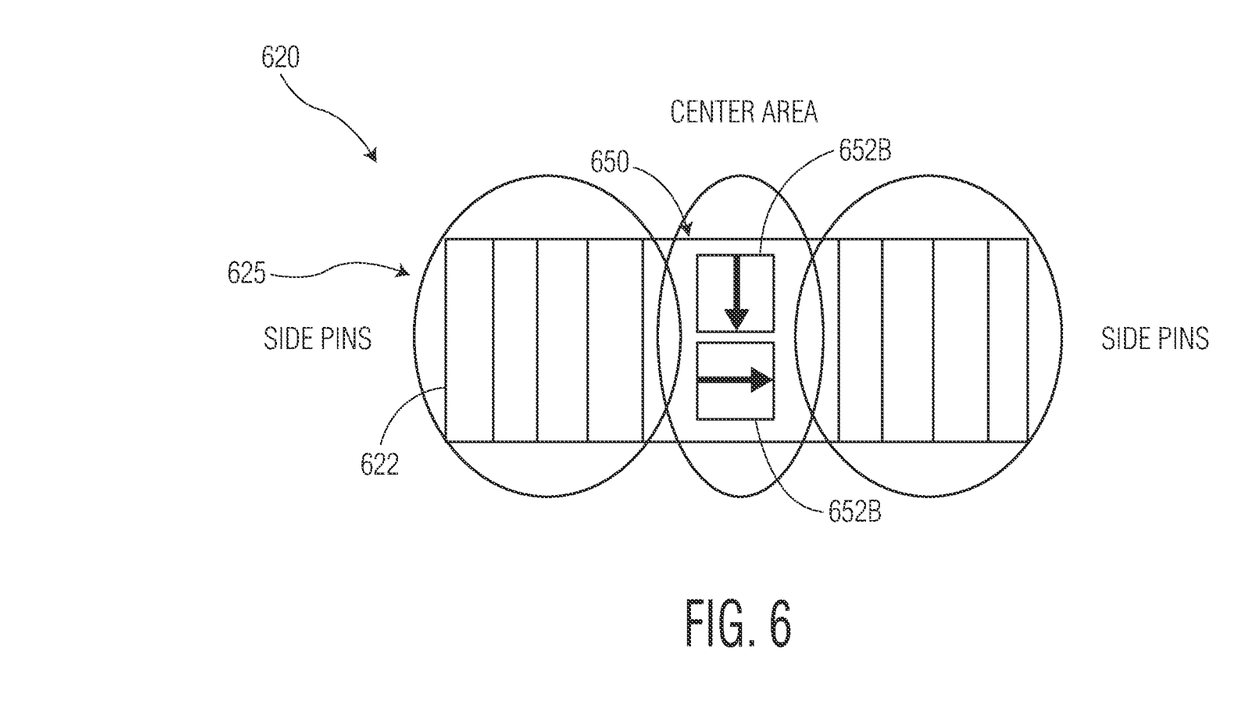
FIG. 6 is a cross-sectional schematic view showing elements of another connector according to one or more embodiments.

Electrical connector ports according to one or more embodiments can include more than one wireless antenna as illustrated in FIG. 6. FIG. 6 which is a schematic cross-sectional view of an electrical connector port 620 with two wireless antennae (the wireless antenna 652A and the wireless antenna 652B) co-located in a region 650 between two sets of signal pins 625. In one or more embodiments, the antenna 652A, 652B are configured to operate (i.e., to transmit or receive) signals with different characteristics in order to eliminate undesired cross-talk between them (e.g., to allow full-duplex communication in which one antenna transmits while another antenna receives). As one non-limiting example, the antenna 652A may be configured to transmit or receive signals characterized by left-handed circular polarization and the antenna 652B may be configured to transmit or receive signals characterized by right-handed circular polarization. As another non-limiting example, the antenna 652A may be configured to transmit or receive signals characterized by vertical polarization and the antenna 652B may be configured to transmit or receive signals characterized by horizontal polarization. It will be understood that the antenna elements 652A, 652B and similar elements can be placed in any suitable manner. For example, the antennae 652A, 652B can be placed separately from each other (e.g., on the left side and right side of the connector in FIG. 6). Alternatively, or in addition, existing signal encoding methods may be used to reduce or eliminate unwanted cross-talk between multiple antennae located within a single connector port.

VARIOUS EXAMPLES

Features of embodiments may be understood by way of one or more of the following examples:

Example 1: a device or method that includes a mobile device having a mobile device housing provided with an electrical connector port disposed within the device housing that is coupled to a wireless antenna. The electrical connector port includes a connector housing and electrical signal pins. The connector housing extends within the mobile device housing and has an aperture exposed at an exterior surface of the device housing. The electrical signal pins are disposed within the connector housing and configured to mate with an electrical connector. The wireless antenna is coupled to the electrical connector port and configured to transmit or receive wireless signals. The connector housing of the electrical connector port is configured to guide electromagnetic radiation between an external environment and the wireless antenna.

Example 2: the device or method of Example 1 in which at least a first portion of the electrical signal pins are disposed along a first side of the connector housing; the wireless antenna is disposed at a rear section of the connector housing; and the connector housing and the wireless antenna are jointly configured and arranged to guide wireless signals to propagate in between the first portion of the electrical signal pins and a side of the connector housing opposite the first portion of the electrical signal pins along a first axis that extends from a front plane of the connector housing at a front section of the connector housing to the rear section of the connector housing.

Example 3: the device or method of Example 1 or Example 2 in which the wireless antenna is a first wireless antenna and the device includes a second wireless antenna adjacent to the first wireless antenna. The connector housing and the second wireless antenna are jointly configured and arranged to guide wireless signals to propagate in between the first portion of the electrical signal pins and the side of the connector housing opposite the first portion of the electrical signal pins along the first axis.

Example 4: the device or method of any of Examples 1-3 in which the connector housing has a width less than 12 mm and a height less than 3 mm.

Example 5: the device or method of any of Examples 1-3, in which the wireless antenna is configured to operate in a frequency range above 40 GHz.

Example 6: the device or method of any of Examples 1-5 in which the wireless antenna is a first wireless antenna; the device further includes a second wireless antenna adjacent to the first wireless antenna; and the first wireless antenna is configured to transmit signals characterized by a first polarization type and the second wireless antenna is characterized to receive signals characterized by a second polarization type that is orthogonal to the first polarization type.

Example 7: the device or method of any of Examples 1-6 where the connector port further includes a solid front face that includes the electrical signal pins; and one or more magnetic elements configured to mate with one or more corresponding magnetic elements of the electrical connector such that the electrical signal pins of the electrical connector port mate with electrical signal pins of the electrical connector. The connector housing and the wireless antenna are jointly configured and arrange to guide wireless signals to propagate through a nonmetallic portion of the solid front face of the electrical connector port along an axis that extends from a front the solid front face of the electrical connector port toward the wireless antenna.

Example 8: the device or method of any of Examples 1-7 in which the wireless antenna is disposed within a nonmetallic portion of the electrical connector port and is spaced apart from the electrical signal pins and one or more magnetic elements of the electrical connector port.

Example 9: the device or method of any of Examples 1-8, in which the wireless antenna is disposed behind the nonmetallic portion of the solid front face of the electrical connector port near a rear portion of the connector housing opposite the solid font face of the electrical connector.

Example 10: the device or method of any of Examples 1-9 in which the mobile device is configuring wirelessly with another device via a wireless antenna coupled to an electrical connector port disposed within a device housing of the mobile device where the electrical connector port includes a connector housing that extends within the mobile device housing and has an aperture exposed at an exterior surface of the device housing; and electrical signal pins that are disposed within the connector housing and configured to mate with an electrical connector.

Example 11: the device or method of any of Examples 1-10 in which includes receiving, by a processor of the mobile device, an electrical signal via one or more of the electrical signal pins of the electrical connector port; determining, by the processor, that the electrical signal indicates that an electrical connector is present within the electrical connector port; and outputting, by the processor and in response to the processor determining that the electrical signal indicates that the electrical connector is present within the electrical connector port, a human-perceptible notification for a user of the mobile device to disconnect the electrical connector from the electrical signal port before initiating wireless communication with the other device.

The preceding detailed description and examples are merely illustrative in nature and are not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no Intention to be bound by any expressed or implied theory presented in the preceding technical field, background, or detailed description.

It should be understood that this invention is not limited in its application to the details of construction and the arrangement of components set forth in the preceding description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including." "comprising." or "having" and variations thereof herein is meant to encompass the items listed thereafter and equivalents thereof as well as additional items. Unless specified or limited otherwise, the terms "mounted," "connected." "supported." and "coupled" and variations thereof are used broadly and encompass both direct and indirect mountings, connections, supports, and couplings. Further, "connected" and "coupled" are not restricted to physical or mechanical connections or couplings.

The preceding discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The preceding detailed description is to be read with reference to the figures, in which like elements in different figures have like reference numerals. The Figures, which are not necessarily to scale, depict selected embodiments and are not intended to limit the scope of embodiments of the invention. Skilled artisans will recognize the examples provided herein have many useful alternatives and fall within the scope of embodiments of the invention.

The connecting lines shown in the various figures contained herein are intended to represent exemplary functional relationships and/or physical couplings between the various elements. It should be noted that many alternative or additional functional relationships or physical connections may be present in one or more embodiments of the subject matter. In addition, certain terminology may also be used herein for the purpose of reference only, and thus are not intended to be limiting, and the terms "first," "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in one or more embodiments of the depicted subject matter.

What is claimed is:

1. A mobile device comprising:
   a device housing;
   an electrical connector port that includes:
      a connector housing that extends within the mobile device housing and has a front section with a front face defined by an aperture exposed at an exterior surface of the device housing;
      electrical signal pins that are disposed within the connector housing and configured to mate with an electrical connector;

a wireless antenna coupled to the electrical connector port configured to transmit or receive wireless signals;

wherein the connector housing of the electrical connector port is configured to guide electromagnetic radiation between an external environment and the wireless antenna along a first axis that extends between the wireless antenna and the front face of the connector housing at the exterior surface of the device housing.

2. The mobile device of claim 1, wherein at least a first portion of the electrical signal pins are disposed along a first side of the connector housing;

wherein the wireless antenna is disposed at a rear section of the connector housing; and wherein the connector housing and the wireless antenna are jointly configured and arranged to guide wireless signals to propagate in between the first portion of the electrical signal pins and a side of the connector housing opposite the first portion of the electrical signal pins along the first axis.

3. The mobile device of claim 2, wherein the wireless antenna is a first wireless antenna;

wherein the device further comprises a second wireless antenna adjacent to the first wireless antenna; and wherein the connector housing and the second wireless antenna are jointly configured and arranged to guide wireless signals to propagate in between the first portion of the electrical signal pins and the side of the connector housing opposite the first portion of the electrical signal pins along the first axis.

4. The mobile device of claim 2, wherein the connector housing has a width less than 12 mm and a height less than 3 mm.

5. The mobile device of claim 4, wherein the wireless antenna is configured to operate in a frequency range above 40 GHz.

6. The mobile device of claim 1, wherein the wireless antenna is a first wireless antenna;

wherein the device further comprises a second wireless antenna disposed within the connector housing adjacent to the first wireless antenna; and wherein the first wireless antenna is configured to transmit signals characterized by a first polarization type and the second wireless antenna is characterized to receive signals characterized by a second polarization type that is orthogonal to the first polarization type.

7. The mobile device of claim 1, wherein the front face of the connector housing is a solid front face within the aperture that includes the electrical signal pins; and wherein the electrical connector port further comprises:
one or more magnetic elements configured to mate with one or more corresponding magnetic elements of the electrical connector such that the electrical signal pins of the electrical connector port mate with electrical signal pins of the electrical connector; and wherein the connector housing and the wireless antenna are jointly configured and arrange to guide wireless signals to propagate through a nonmetallic portion of the solid front face of the electrical connector port along the first axis.

8. The mobile device of claim 7, wherein the connector housing has a width less than 12 mm and a height less than 3 mm.

9. The mobile device of claim 8, wherein the wireless antenna is configured to operate in a frequency range above 40 GHz.

10. The mobile device of claim 7, wherein the wireless antenna is disposed within the nonmetallic portion of the electrical connector port and is spaced apart from the electrical signal pins and the one or more magnetic elements of the electrical connector port.

11. The mobile device of claim 7, wherein the wireless antenna is disposed behind the nonmetallic portion of the solid front face of the electrical connector port near a rear portion of the connector housing opposite the solid font face of the electrical connector.

12. The mobile device of claim 7, wherein the wireless antenna is a first wireless antenna; and wherein the device further comprises a second wireless antenna disposed within the connector housing adjacent to the first wireless antenna.

13. A method comprising:

disposing, within a device housing of the device, an electrical connector port comprising a connector housing and electrical signal pins disposed within the connector housing, such that an aperture of the connector port defines a front plane of the connector housing that exposes the electrical signal pins at an exterior surface of the device housing;

disposing, within the device housing of the device, a wireless antenna coupled to the electrical connector port;

wherein the electrical signal pins and configured to mate with a corresponding electrical connector within the aperture; and wherein the connector housing is configured to guide wireless signals between an external environment and the wireless antenna along a first axis that extends between the wireless antenna and front face of the connector housing; and wherein the wireless antenna coupled to the electrical connector port is configured to transmit or receive the wireless signals.

14. The method of claim 13, wherein at least a first portion of the electrical signal pins are disposed along a first side of the connector housing;

wherein the wireless antenna is disposed at a rear section of the connector housing; and wherein the connector housing and the wireless antenna are jointly configured and arranged to guide wireless signals to propagate in between a first portion of the electrical signal pins and a side of the connector housing opposite the first portion of the electrical signal pins along the first axis from the front face of the connector housing at a front section of the connector housing to the rear section of the connector housing.

15. The method of claim 14, wherein the wireless antenna is a first wireless antenna;

wherein the method further comprises disposing a second wireless antenna coupled to the electrical connector port adjacent to the first wireless antenna within the device housing; and wherein the connector housing and the second wireless antenna are jointly configured and arranged to guide wireless signals to propagate in between the first portion of the electrical signal pins and the side of the connector housing opposite the first portion of the electrical signal pins along the first axis.

16. The method of claim 13, wherein the connector housing has a width less than 12 mm and a height less than 3 mm and the wireless antenna is configured to operate in a frequency range above 40 GHz.

17. The mobile device of claim 13,
wherein the front face of the connector housing is a solid front face that includes the electrical signal pins; and
wherein the electrical connector port further comprises:
one or more magnetic elements configured to mate with one or more corresponding magnetic elements of the electrical connector such that the electrical signal pins of the electrical connector port mate with electrical signal pins of the electrical connector; and
wherein the connector housing and the wireless antenna are jointly configured and arranged to guide wireless signals to propagate through a nonmetallic portion of the solid front face of the electrical connector port along the first axis.

18. The mobile device of claim 17,
wherein the wireless antenna is disposed within the nonmetallic portion of the electrical connector port and is spaced apart from the electrical signal pins and the one or more magnetic elements of the electrical connector port.

19. The mobile device of claim 17,
wherein the wireless antenna is disposed behind the nonmetallic portion of the solid front face of the electrical connector port near a rear portion of the connector housing opposite the solid font face of the electrical connector.

20. The mobile device of claim 17,
wherein the wireless antenna is a first wireless antenna; and
wherein the device further comprises a second wireless antenna adjacent to the first wireless antenna.

21. A method comprising:
configuring a mobile device to communicate wirelessly with another device via a wireless antenna coupled to an electrical connector port disposed within a device housing of the mobile device;
wherein the electrical connector port comprises:
a connector housing that extends within the mobile device housing and has an aperture that defines a front face of the connector housing exposed at an exterior surface of the device housing;
electrical signal pins that are disposed within the connector housing and configured to mate with an electrical connector;
wherein the wireless antenna coupled to the electrical connector port configured to transmit or receive wireless signals using a transmission frequency of at least 40 GHz;
wherein the connector housing of the electrical connector port is configured to guide electromagnetic radiation between an external environment and the wireless antenna along a first axis that extends between the wireless antenna and the front face of the connector housing.

22. The method claim 21, further comprising:
receiving, by a processor of the mobile device, an electrical signal via one or more of the electrical signal pins of the electrical connector port;
determining, by the processor, that the electrical signal indicates that an electrical connector is present within the electrical connector port; and
outputting, by the processor and in response to the processor determining that the electrical signal indicates that the electrical connector is present within the electrical connector port, a human-perceptible notification for a user of the mobile device to disconnect the electrical connector from the electrical signal port before initiating wireless communication with the other device.

* * * * *